United States Patent [19]

Kennedy

[11] 4,221,656

[45] Sep. 9, 1980

[54] METHOD OF EXTRACTING SLUDGE FROM SEWAGE

[76] Inventor: Sterling R. Kennedy, 3460 Hollenberg Dr., Bridgeton, Mo. 63044

[21] Appl. No.: 625,208

[22] Filed: Oct. 23, 1975

Related U.S. Application Data

[60] Continuation of Ser. No. 542,165, Jan. 20, 1975, abandoned, which is a division of Ser. No. 435,262, Jan. 21, 1974, Pat. No. 3,878,101, which is a division of Ser. No. 222,229, Jan. 31, 1972, Pat. No. 3,809,245.

[51] Int. Cl.² .............................................. C02C 1/02
[52] U.S. Cl. ...................................... 210/805; 210/14; 210/15; 210/629; 261/77
[58] Field of Search ............. 210/7, 13, 14, 15, 195 R, 210/220, 65, 70, 8; 261/77, 124

[56] References Cited

U.S. PATENT DOCUMENTS

| | | | |
|---|---|---|---|
| 839,892 | 1/1907 | Rottmann | 210/202 |
| 1,937,434 | 11/1933 | Piatt | 210/14 |
| 2,144,385 | 1/1939 | Nordell | 210/15 |
| 2,532,457 | 12/1950 | Morgan | 261/124 |
| 2,640,027 | 5/1953 | McNamee et al. | 210/14 |
| 3,133,878 | 5/1964 | Kober | 210/14 |
| 3,161,590 | 12/1964 | Weis | 261/124 |
| 3,216,573 | 11/1965 | Irion | 210/220 |
| 3,398,089 | 8/1968 | Mackrle | 210/195 R |
| 3,495,712 | 2/1970 | Schrriben | 201/124 |
| 3,595,396 | 7/1971 | Mackrle | 210/208 |
| 3,627,136 | 12/1971 | Mackrle | 210/510 R |
| 3,709,363 | 1/1973 | Smart et al. | 210/220 |
| 3,710,941 | 1/1973 | Brociner | 210/220 |
| 3,809,245 | 5/1974 | Kennedy | 210/220 |

FOREIGN PATENT DOCUMENTS

| | | | |
|---|---|---|---|
| 541289 | 9/1955 | Belgium | 210/15 |
| 16508 | of 1910 | United Kingdom | 210/14 |

*Primary Examiner*—Ernest G. Therkorn
*Attorney, Agent, or Firm*—John D. Pope, III

[57] ABSTRACT

A sewage treatment apparatus having an aeration circulation system for separating sludge from sewage wherein sewage is circulated around an outlet port shielded by a circulation guide member. The circulating sewage causes solid matter contained therein to move radially away from the outlet port so that liquid entering the outlet port is substantially free of solids.

9 Claims, 3 Drawing Figures

METHOD OF EXTRACTING SLUDGE FROM SEWAGE

This is a continuation, of application Ser. No. 542,165, filed Jan. 20, 1975, now abandoned, which is a division of my copending application Ser. No. 435,262, filed Jan. 21, 1974 now U.S. Pat. No. 3,878,101, which was in turn a division of and was copending with my application Ser. No. 222,229, filed Jan. 31, 1972, now U.S. Pat. No. 3,809,245.

This invention is directed to new and useful improvements in sewage treatment apparatus and more particularly to a sewage treatment apparatus having an aeration circulation system for separating sludge from sewage.

Sewage treatment processes are generally classified as primary and secondary, the primary treatment usually involving a trapping of floating, suspended and settleable solids. Secondary treatments generally involve a chemical processing of the sewage although the line between primary and secondary treatments cannot always be sharply drawn.

Some well known methods for trapping suspended, settleable, or floating solids involve the use of screen and filter devices. These devices have a tendency to clog and must often be cleaned or replaced on a regular basis. Maintenance of this type is time consuming, costly and can necessitate temporary shutdowns of a sewage treatment apparatus.

Among the several objects of the present invention may be noted the provision of a novel sewage treatment apparatus; a novel sewage treatment apparatus which eliminates sludge-separating screens and filters; a novel sewage treatment apparatus substantially free of moving parts; a novel sewage treatment apparatus for separating sludge from sewage by means of a novel aeration system; a novel sewage treatment apparatus having a novel liquid circulation chamber; a novel sewage treatment apparatus which separates sludge from sewage by circulating sewage along a generally circular path; a novel sewage treatment apparatus employing air to circulate the sewage on a generally circular path; a novel sewage treatment apparatus having a novel outlet port, shield arrangement and air flow system for extracting sludge from sewage; and a novel method for treating sewage. Other objects and features will be in part apparent and in part pointed out hereinafter.

The present invention relates to a novel primary sewage treatment apparatus for extracting sludge from sewage. In one embodiment of the invention the sewage treatment apparatus comprises a primary liquid circulation chamber wherein sewage is circulated around a curved circulation guide barrier that shields an outlet port. The sewage circulates due to the introduction of pressurized air in the chamber liquid which air is directed along a predetermined path, thereby influencing liquid circulation. The circulation guide barrier extends between opposite walls of the primary chamber to prevent the liquid from crossing over the barrier to the outlet port. An entry opening is provided in the Barrier leading to the outlet port to ensure that liquid passes into the outlet port along a predetermined path. Under this arrangement the outlet port is located substantially centrally of the circulating liquid, and sludge that is present in the liquid tends to move radially away from the outlet port. Liquid entering the outlet port is thus rendered substantially free of sludge. The radially moving sludge tends to sink to the bottom of the primary circulation chamber and is drawn outwardly therefrom by suction apparatus comprising a perforated suction pipe disposed at the bottom of the chamber.

Liquid passing through the outlet port of the primary circulation chamber enters a flowage chamber containing a flowage outlet duct that conveys the liquid into a second circulation chamber. Liquid movement through the flowage outlet duct is aided by air pumped into the flowage chamber, which air also passes through the flowage outlet duct. The second circulation chamber circulates the liquid in a manner similar to that described for the primary circulation chamber. The second circulation chamber also includes a scum-collection trough for removal of any scum floating on the liquid surface. Following secondary circulation the liquid passes into a collection chamber that pools the circulated liquid. The collection chamber includes weirs for skimming a surface layer of the pooled water and drainage pipes associated with the weirs for finally removing the skimmed liquid from the sewage treatment apparatus.

The invention accordingly comprises the constructions and methods hereinafter described, the scope of the invention being indicated in the following claims.

In the accompanying drawings, in which one of various possible embodiments of the invention is illustrated, FIG. 1 is a perspective view of a sewage treatment apparatus incorporating the present invention;

Corresponding reference characters indicate corresponding parts throughout the several views of the drawings.

Figure 1:
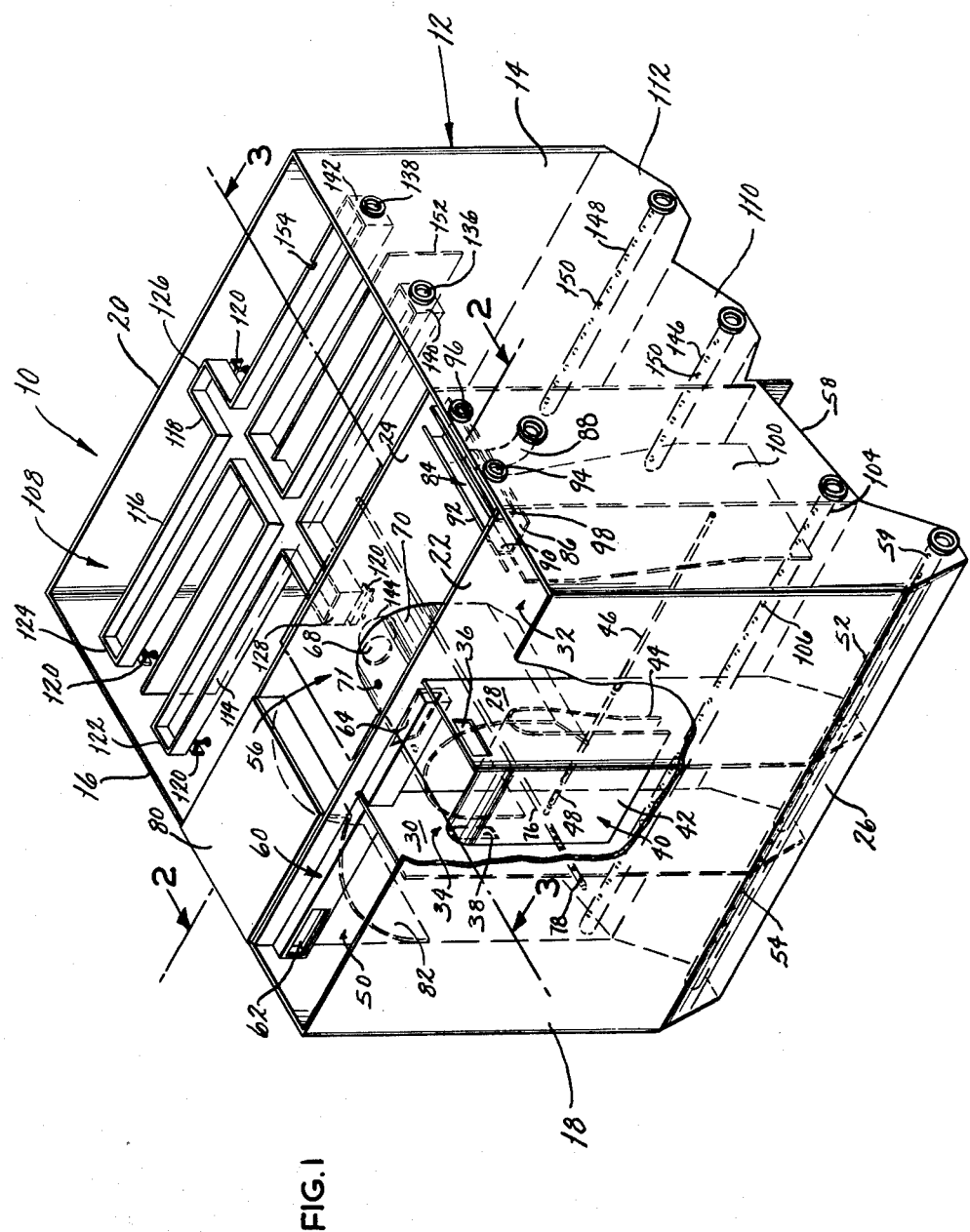

Referring to the drawings for a detailed description of the present invention, a sewage treatment apparatus incorporating one embodiment thereof is generally indicated by reference numeral 10. Sewage treatment apparatus 10 comprises a multi-chamber housing 12 made of any suitable material such as steel. Housing 12 comprises exterior oppositely disposed side walls 14, 16 and 18, 20. Opposite side walls 14, 16, are of similar size and shape while side wall 18 is of a larger vertical dimension than opposite side wall 20. Housing 12 also includes spaced inner partitions 22 and 24 extending between opposite side walls 14 and 16. The space between side wall 18 and partition 22 is provided with a hopper bottom 26 and which space is subdivided by spaced and parallel baffles 28 and 30 extending between side wall 18 and partition 22. The bottom portions of baffles 28 and 30 conform in shape with hopper bottom 26. The enclosure bounded by side walls 14, 18, baffle 28 and partition 22 comprises a sewage inlet chamber generally indicated by reference numeral 32. Inlet chamber 32 includes a conventional grating (not shown) and a conventional grinder (not shown) for reducing most of the sewage materials entering housing 12 to a uniform pulp. Housing 12 further comprises a primary circulation chamber 34 bounded by baffles 28 and 30, side wall 18 and partition 22. Baffle 28 includes a sewage inlet opening 36 which feeds sewage from inlet chamber 32 to primary circulation chamber 34. Baffle 30 is provided with an outlet port 38 opposite to and spaced below the level of inlet opening 36. Primary circulation chamber 34 further includes a U-shaped sheet-like barrier 40 formed around a peripheral portion of outlet port 38 such that port 38 is disposed in a concave zone of barrier 40. Barrier 40 extends from baffle 30 to baffle 28 and is fastened to baffles 30 and 28 by welding, for instance. Barrier 40 includes spaced depending leg portions 42 and 44 defining a channel-like entry opening 45 to outlet port 38. An air-pressure pipe 46 disposed between barrier leg 44 and partition 22 is supported by baffles 28 and 30 and extends through inlet chamber 32 outwardly of housing 12. The segment of pipe 46 within primary chamber 34 is provided with air-exit perforations 48 opening away from hopper bottom 26.

Housing 12 further comprises a flowage chamber 50 bounded by side walls 18 and 16, partition 22 and baffle 30. A sludge suction pipe 52 is disposed in hopper bottom 26 and extends through chambers 32, 34 and 50. Pipe 52 includes peripheral sludge inlet perforations 54 along its entire length within housing 12. Pipe 52 is arranged to extend outwardly of housing 12 at side wall 14, the junction of pipe 52 with side wall 14 being a fluid-tight seal.

Housing 12 further includes a secondary circulation chamber 56 adjacent to and extending the combined length of chambers 32, 34 and 50. Secondary circulation chamber 56 is bounded by opposite side walls 14, 16 and partitions 22, 24. Chamber 56 also includes a flat bottom floor 58 downwardly inclined from partition 24 to partition 22. A flowage outlet duct 60 extends along partition 22 within chambers 34 and 50 and includes an opening 62 communicating with flowage chamber 50. Flowage outlet duct 60 also includes an oppositely disposed opening 64 communicating with secondary circulation chamber 56 through a cutout 66 provided in partition 22. A secondary circulation chamber outlet port 68 is provided in partition 24 and includes a generally U-shaped sheet-like barrier 70 formed around a peripheral portion of outlet port 68 such that port 68 is disposed in a concave zone of barrier 70. Barrier 70 extends between partitions 22 and 24 and includes spaced depending leg portions 72 and 74 defining a channel-like entry opening 75 to outlet port 68. An air-pressure pipe 76 disposed between barrier leg 74 and side wall 16 is supported by partition 24 and extends outwardly of housing 12 through side wall 20. The segment of pipe 76 within chamber 56 is provided with air-exit perforations 78 opening away from chamber floor 58.

Secondary circulation chamber 56 further includes a hollow eave member 80 secured to side wall 16 and extending between partitions 22 and 24. Eave member 80 includes a curved concave surface 82 spaced from and facing barrier 70. Secondary circulation chamber 56 further includes a scum trough 84 adjacent side wall 14 and extending between partitions 22 and 24. Scum trough 84 includes a base 86 having a drain pipe 88 extending therefrom through side wall 14 and outwardly of housing 12. Trough 84 further includes a lip 90 having an inclined plate 92 secured thereto. A pair of air-exit openings 94 and 96 are disposed in side wall 14 over scum trough 84 and communicate with air-exit pipes (not shown) secured to side wall 14 and extending outwardly of housing 12. An L-shaped shield member 98 secured to side wall 14 adjacent openings 94 and 96 extends between partitions 22 and 24. Secondary circulation chamber 56 also includes a plate-like baffle member 100 disposed intermediate barrier leg 72 and side wall 14. Baffle member 100 extends between partitions 22 and 24 and has an upper edge 102 spaced below base 86 of scum trough 84. A sludge suction pipe 104 is disposed at the intersection of chamber floor 58 and partition 22 which is the lowest portion of secondary circulation chamber 56. Suction pipe 104 extends from wall 16 through baffle 100 to wall 14 and thereafter is arranged to extend outwardly of housing 12 at wall 14. Pipe 104 includes peripheral sludge inlet perforations 106 along its entire length within chamber 56.

Housing 12 also includes a collection chamber 108 adjacent secondary circulation chamber 56. Collection chamber 108 is bounded by side walls 14, 20, 16 and partition 24. Collection chamber 108 includes double hopper bottoms 110 and 112 and channel-type cross-weirs 114, 116 and 118 mutually communicating with one another. Weir level adjusters 120 are provided at ends 122, 124, 126 and 128 of weirs 114, 116 and 118, respectively. Weir level adjusters 120 comprise an angle having one leg 130 secured to side wall 16, for instance, and another leg 132 projecting from wall 16 into chamber 108. Leg 132 is provided with a pair of adjusting screws 134 arranged to support weir ends 122 and 124 of weirs 114 and 116, for instance. The height of weir ends 122 and 124 can be varied with respect to leg 132 by rotation of adjustment screws 134. A pair of weir drains 136, 138 are provided at corresponding ends 140, 142 of weirs 114 and 116, respectively, which drains are arranged to communicate with drain pipes (not shown) extending from side wall 14 outwardly of housing 12. Weirs 114 and 116 are shallower at ends 122, 124 than at ends 140, 142. Collection chamber 108 further includes an inlet elbow pipe 144 in partition 24 communicating with outlet port 68 of secondary circulation chamber 56. Inlet elbow pipe 144 is spaced below weirs 114, 116 and 118, and opens toward double hopper bottoms 110, 112. A pair of sludge-suction pipes 146, 148 are disposed on hopper bottoms 110, 112, respectively. Pipes 146, 148 include peripheral sludge inlet perforations 150 and are arranged to extend outwardly of housing 12 at wall 14. A short stilling baffle member 152 spaced from hopper bottoms 110,112 is disposed between weirs 114 and 116 and extends from wall 14 to wall 116.

In operation of sewage treatment apparatus 10, cover plates (not shown) are normally placed over each chamber in housing 12 so that housing 12 is essentially sealed from the outside air. Incoming sewage is fed into inlet chamber 32 where it passes through a grate (not shown) and is then ground by a conventional grinder (not shown). It should be noted that the incoming sewage is grated to remove debris such as rocks, twigs and other solid materials that cannot be easily ground. The grinder helps reduce the grindable sewage to a uniform consistency. The heavier sludge in the sewage immediately sinks to hopper bottom 26 and is periodically drawn into sludge suction pipe 52 through sludge inlet perforations 54 by suction apparatus (not shown).

Figure 3:
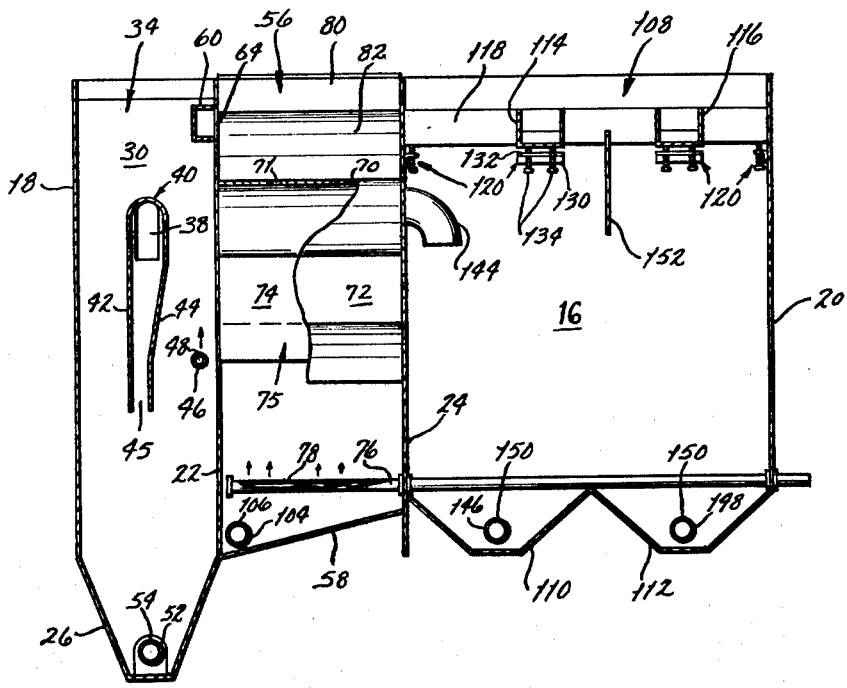
FIG. 3 is a sectional view thereof taken on the line 3—3 of FIG. 1.

Sewage enters primary circulation chamber 34 through inlet opening 36 in baffle 28 and fills the primary chamber to a level which approaches but does not reach the upper edges of baffles 28 and 30. Conventional air supply equipment (not shown) is interconnected to pipe 46 to pump pressurized air through air-exit perforations 48 into primary circulation chamber 34. Perforations 48 are arranged in air pipe 46 to permit air to issue therefrom in a substantially upward direction toward the liquid surface. This efflux of air is continuous and causes the sewage to flow away from air pipe 46 along a circulatory path that is in part defined by barrier 40 which serves as a circulation guide member for the sewage. Under the circulation guide arrangement of barrier 40 the sewage moves from air pipe 46 in a counterclockwise direction around barrier 40, as viewed in FIG. 3. The circulating movement of the sewage tends to cause the sludge that is present therein to move radially away from barrier 40 so that circulating liquid which passes through entry opening 45 of barrier 40 to outlet port 38 is relatively sludge-free. In this manner liquid passes through outlet port 38 along a predetermined path defined by entry opening 45. The sludge particles, after radially moving to the periphery of the circulatory path, tend to sink toward hopper bottom 26 and are periodically drawn into suction pipe 52 through sludge inlet perforations 54.

The relatively sludge-free liquid passing through outlet port 38 enters flowage chamber 50, which chamber is subjected to air-pressure from an external source that is not shown. The air-pressure in flowage chamber 50 aids the flow of liquid through opening 62 in duct 60 and further aerates the liquid. A portion of opening 62 always remains above the liquid surface level in flowage chamber 50 to ensure that liquid plus air can flow through duct 60 toward opposite duct opening 64 which leads into secondary circulation chamber 56. As sludge suction pipe 52 also extends into flowage chamber 50, any sludge which settles to hopper bottom 26 of chamber 50 is periodically drawn into suction pipe 52 as previously described.

Figure 2:
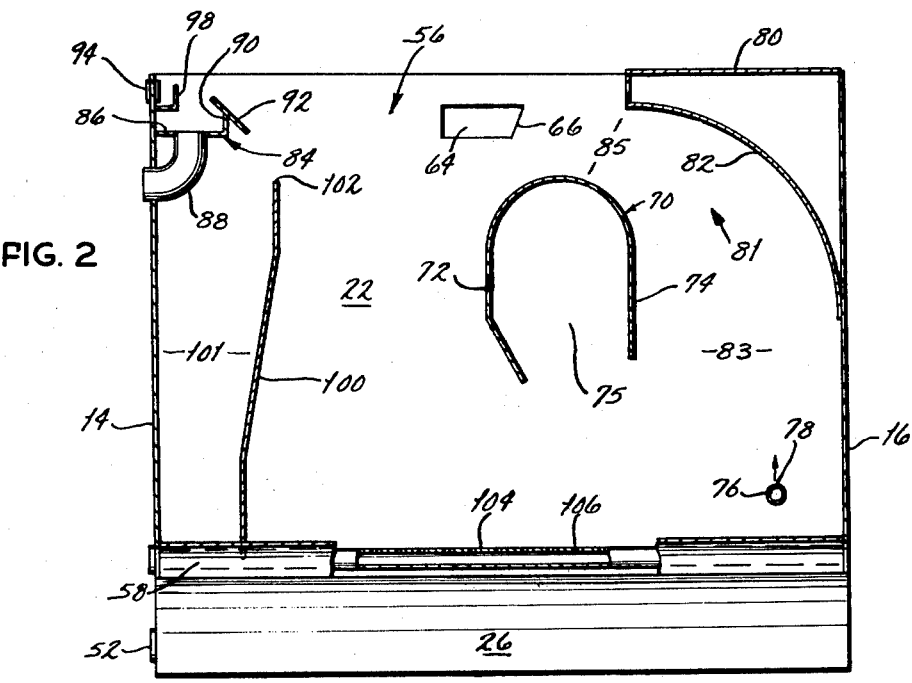
FIG. 2 is a sectional view thereof taken on the line 2—2 of FIG. 1.

Secondary circulation chamber 56 operates similarly to primary chamber 34. Pressurized air issues from perforations 78 of pipe 76 to cause liquid to circulate in a counterclockwise direction around barrier 70, as viewed in FIG. 2. Eave member 80 and barrier 70 serve as guide members for the circulating liquid with the spacing between eave member 80 and barrier member 70 defining a guide course 81 through which the liquid flows. It will be noted that the space between eave member 80 and barrier leg 74 at an end 83 of guided course 81 is greater than the spacing between eave member 80 and barrier 70 at an end 85 of guide course 81, thereby providing a venturi or nozzle effect to the liquid as it circulates from end 83 to end 85. Thus liquid entering secondary circulation chamber 56 through cutout 66 is driven in a counterclockwise direction around barrier 70 (FIG. 2) by the liquid that circulates past end 85 of guide course 81. Under this arrangement solid particles entering chamber 56 are urged over baffle 100 into a trap space 101 bounded by baffle 100, side wall 14 and partitions 22, 24. Solid particles entering trap space 101 eventually sink toward floor 58 and sludge suction pipe 104 for disposal in a manner previously described for suction pipe 52. The circulating liquid also causes solid particles in secondary circulation chamber 56 to move radially away from barrier 70 such that liquid passing through entry opening 75 to outlet port 68 in partition 24 is substantially free of solid material. Further, the sludge particles, after radially moving to the periphery of the circulatory path, tend to sink toward floor 58 and sludge suction pipe 104 for disposal in a manner previously described. If desired, openings 71 can be provided in barrier 70 to permit escape of any air trapped thereunder. Similar openings can be provided in barrier 40. Any floating scum at the liquid surface level in secondary circulation chamber 56 is drawn toward scum trough 84 by the counterclockwise movement of circulating liquid and also by the movement of air within chamber 56 toward air-exit openings 94, 96 positioned over scrum trough 84. Inclined plate 92 facilitates movement of scum into trough 84 and helps to prevent scum from backing off trough 84 into the circulating liquid. Shield member 98 prevents scum or liquid from entering air-exit openings 94, 96. In this manner floating and settleable solids in secondary circulation chamber 56 are isolated from outlet port 68 and substantially solid-free liquid passes through inlet elbow pipe 144 into collection chamber 108.

Weirs 114, 116, 118 of collection chamber 108 are arranged to permit a portion of the surface layer of liquid in chamber 108 to overflow into the weir channels. The overflow or skimmed liquid is directed toward weir drains 136 and 138 for final removal from apparatus 10. Weirs 114 and 116 are inclined downwardly from side wall 16 of housing 12 to side wall 14. This inclination is due to the relative shallowness of weirs 114, 116 at weir ends 122,124 as compared to weir ends 140,142. The inclination of weirs 114, 116 and 118 from side wall 16 to side wall 14 can be manually controlled by adjusting screws 134 in weir level adjusters 120. If desired the side walls of weirs 114, 116 and 118 can be notched as shown at 154 to facilitate skimming of liquid onto the weirs. Stilling baffle 152 serves to minimize lateral movement of liquid in collection chamber 108. Should any solid materials be present in the collection chamber liquid, they will tend to sink toward hopper bottoms 110 and 112 for disposal in sludge suction pipes 146, 148, in a manner previously described. It may be noted that sludge suction pipes 146 and 148 do not extend from side wall 14 all the way toward side wall 16. This is because hopper bottoms 110 and 112 incline downwardly from side wall 16 to side wall 14. If desired sludge suction pipe 104 in secondary circulation chamber 56 can be similarly foreshortened by arranging chamber floor 58 to incline downwardly from side wall 16 to side wall 14.

As the liquid in the presently disclosed apparatus is extensively aerated, aerobic bacteria generally found in sewage have a tendency to thrive. Such bacteria are heavily present in any sludge that accumulates at the bottom of collection chamber 108 and are highly beneficial toward breaking down sludge into harmless constituents. Consequently a transfer pipe (not shown) can be used to interconnect one or both sludge suction pipes 146 and 148 in collection chamber 108 to primary circulation chamber 34 to return some of the collection chamber sludge to primary circulation chamber 34 to accelerate bacterial breakdown of sludge in the primary chamber.

As will be apparent to those skilled in the art, the shape and size of the particular chambers within sewage treatment apparatus 10 can be varied as well as the shape and size of circulation guide members 40, 70. Some advantages of the novel sewage treatment apparatus and method for treating sewage evident from the foregoing description include a compact primary apparatus capable of processing a high volume of sewage in a relatively short period of time. This is due in part to aeration circulation of the sewage. For example, an apparatus as disclosed herein built to occupy a total volume of less than 900 cubic feet is capable of processing approximately 200,000 gallons of sewage a day. This is due to a retention time of approximately 10 minutes, i.e., sewage entering apparatus 10 through inlet chamber 32 is treated and removed approximately 10 minutes later from weir drains 136, 138. Excluding the grinder, a further advantage is the absence of any moving parts in the sewage treatment system. It can also be appreciated that sludge separation is accomplished without sludge-removing screens or filters. Consequently sewage treatment apparatus 10 requires little or no maintenance. Other advantages include a completely enclosed primary sewage treatment system, extensively aerated sewage which promotes the growth of beneficial aerobic bacteria, and suction drainage of the sludge.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method for treating sewage for extracting sludge therefrom comprising bringing the sewage in liquid form into a container having an inlet and an outlet, introducing a stream of gas into said sewage to circulate the sewage liquid in a generally circular endless path about the outlet opening to move sludge in the sewage radially away from the outlet opening, shielding the outlet opening from the endless path followed by the circulating liquid, and providing an entry to the outlet opening such that a portion of the circulating liquid substantially free of sludge passes into the outlet opening along a channel-like path remote from the periphery of the circulating sewage to remove water from the container.

2. A method as claimed in claim 1 wherein the step of circulating further comprises causing the gas to move in a channel-like direction to effect a channel-like circulation of the sewage.

3. A method as claimed in claim 2 wherein the step of circulating further comprises draining surface scum from the circulating liquid by providing a drain in the path of surface liquid movement.

4. A method as claimed in claim 1 wherein the step of shielding further comprises forming a barrier around the outlet opening such that circulating liquid is prevented from crossing over said barrier to said opening.

5. A method as claimed in claim 4 wherein the step of providing an entry to the outlet opening further comprises forming an opening in the barrier such that water enters the outlet opening through the barrier along a channel-like path.

6. A method as claimed in claim 1 further including the step of transferring the circulating water for recirculation about a second outlet opening, shielding the second outlet opening from the recirculating water and providing an entry to the second outlet opening such that liquid enters the second outlet opening along a channel-like path.

7. A method as claimed in claim 1 further including the step of collecting the circulated water in a pool and skimming an upper surface layer of the pooled water.

8. A method for treating sewage for extracting sludge therefrom comprising bringing the sewage in liquid form into a container having an inlet and an outlet, introducing a stream of gas into said sewage to circulate the sewage liquid in a generally circular endless path about the outlet opening to move sludge in the sewage radially away from the outlet opening, shielding the outlet opening from the endless path followed by the circulating liquid, providing an entry to the outlet opening such that a portion of the circulating liquid passes into the outlet opening along a channel-like path remote from the periphery of the circulating sewage to remove water from the container and trapping the sludge that is moved radially from the outlet opening.

9. A method as claimed in claim 8 wherein the step of trapping includes sucking the sludge into an area separate from the liquid.

* * * * *

UNITED STATES PATENT AND TRADEMARK OFFICE
CERTIFICATE OF CORRECTION

PATENT NO. : 4,221,656
DATED : September 9, 1980
INVENTOR(S) : Sterling R. Kennedy It is certified that error appears in the above—identified patent and that said Letters Patent is hereby corrected as shown below:

Column 1, line 61, "Barrier" should read -- barrier --.

Column 4, line 39, "116", second occurrence, should read

-- 16 --.

Column 5, line 66, "scrum" should read -- scum --.

Signed and Sealed this

Ninth Day of December 1980

[SEAL]

Attest:

SIDNEY A. DIAMOND

Attesting Officer     Commissioner of Patents and Trademarks